United States Patent [19]
Wigstol et al.

[11] 3,887,679
[45] June 3, 1975

[54] SEPARATION OF COPPER FROM COBALT

[75] Inventors: Eivind Wigstol; Kjell Elnar Froyland, both of Kristiansand-S, Norway

[73] Assignee: Falconbridge Nickel Mines Limited, Toronto, Ontario, Canada

[22] Filed: May 31, 1972

[21] Appl. No.: 258,396

[52] U.S. Cl. ............... 423/24; 423/139; 75/101 BE
[51] Int. Cl. .................... C01g 3/00; C01g 51/00
[58] Field of Search ............... 423/24, 139; 75/117; 204/112

[56] References Cited
UNITED STATES PATENTS

| | | | |
|---|---|---|---|
| 3,085,054 | 4/1963 | Thornhill | 204/113 |
| 3,224,873 | 12/1965 | Swanson | 75/101 BE |
| 3,446,720 | 5/1969 | Brooks | 204/112 |
| 3,664,815 | 5/1972 | Wigstol | 75/117 X |
| 3,752,745 | 8/1973 | Kane et al. | 423/24 X |

OTHER PUBLICATIONS

Olsen "Solvent Extraction of Chlorocomplexes by Tri-isooctylamine/Carbontetrachloride from Hydrochloric Acid Medium," Acta Chemica, Scandinavica 20 (1966), pp. 1621-1625.

Alian et al. "Extraction of Antimony with Tertiary Amines," Talanta, 1967, Vol. 14, pp. 659-669.

Primary Examiner—Oscar R. Vertiz
Assistant Examiner—Brian E. Hearn
Attorney, Agent, or Firm—Ridout & Maybee

[57] ABSTRACT

A solvent extraction process for the improved separation of copper from cobalt in chloride solutions in which an organic solution containing an amine solvent, such as tri-iso-octyl-amine, is cycled around a closed organic circuit comprising in turn co-extraction of cobalt and copper from the chloride solution, preferential stripping of cobalt from the organic solution into water or dilute chloride solution thereby forming a cobalt eluate, stripping of copper from the organic, and return of the regenerated organic to the co-extraction step. The invention comprises dividing the organic into two streams, co-extracting cobalt and copper from the chloride solution into one stream, preferentially extracting copper from the cobalt eluate into the other stream, and combining the two streams for preferential cobalt stripping therefrom, thereby forming a closed preferential cobalt stripping, preferential copper extracting circuit and producing a purified cobalt eluate.

8 Claims, 4 Drawing Figures

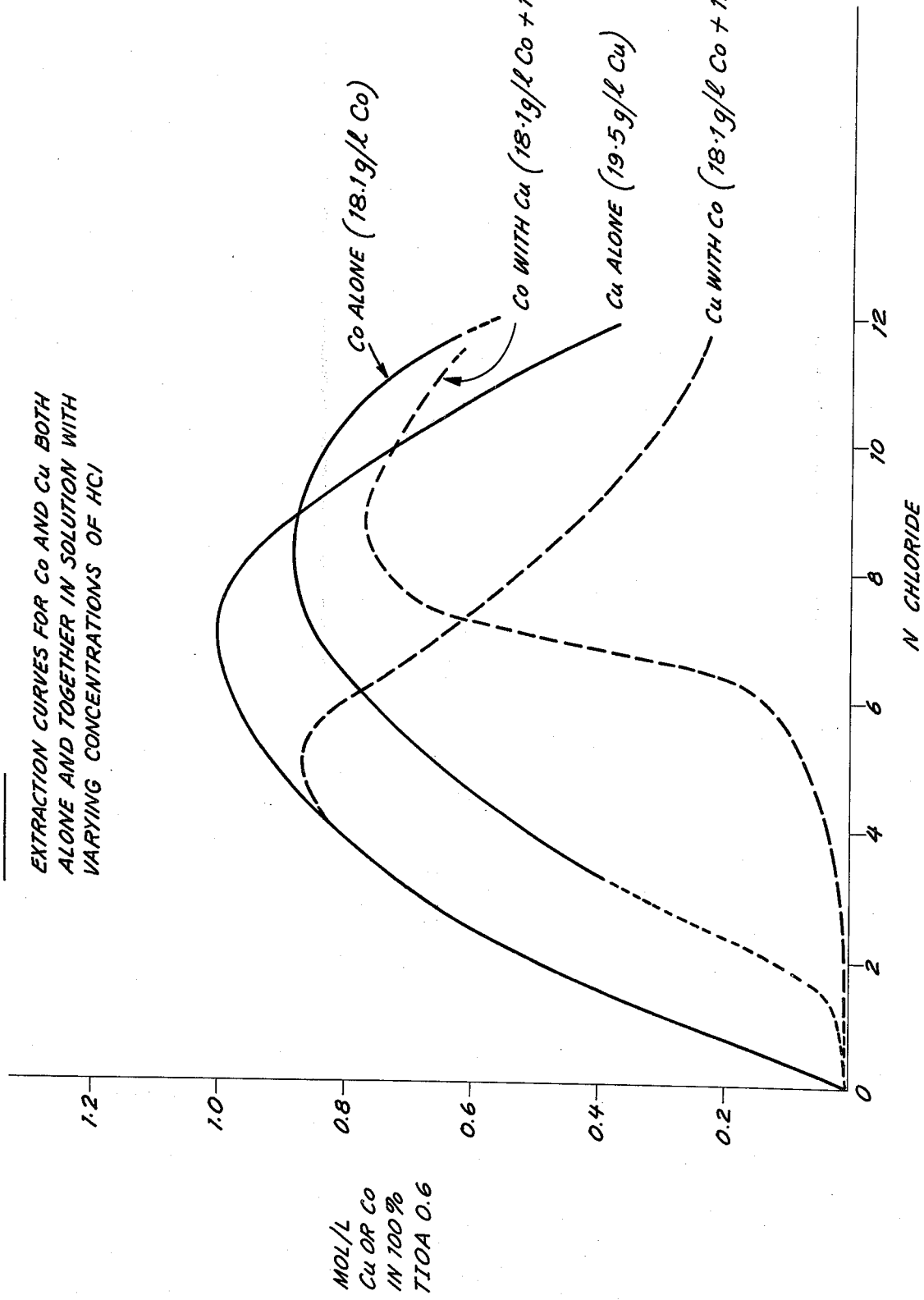

SEPARATION OF COPPER FROM COBALT

FIELD OF THE INVENTION

The invention relates generally to the separation of one metal from another in aqueous solutions, more particularly to the separation of copper from cobalt in chloride solutions, and specifically to the separation of these metals by solvent extraction employing amine solvents such as tri-iso-octyl-amine. The latter is referred to subsequently herein as TIOA.

DESCRIPTION OF THE PRIOR ART

The separability by solvent extraction of one metal from another present with it in solution is usually inferred, in the absence of more direct information, from the relationship of the separate extraction curves for each of the two metals present alone in the solution. In the case of cobalt and copper in chloride solutions, published extraction curves for the separate metals plotted against HCl concentration or total Cl⁻ ion concentration are so similar in position and shape that the implied separability does not appear to be of practicable commercial significance or value. Since no publication exists, so far as is known, giving direct information on the separability of copper from cobalt in solution, there is therefore apparently no indication in the existing literature that copper co-existing with cobalt in chloride solutions can be substantially completely separated from the cobalt by solvent extraction means. Applicants have now developed such means, however, and these are the subject of the present invention.

The invention is particularly useful in the treatment of chloride solutions that contain concentrations of cobalt and copper that are relatively small compared to the major chlorides present but too large to consider as discardable impurities. Thus it is necessary not only to separate the cobalt and copper from the chloride solution but also to recover them as well. In the recovery of nickel from matte by the HCl leaching process described in U.S. Pat. No. 3,085,054, for example, chloride leach solutions have been generated with the following approximate composition in g/L:

| Ni | Co | Cu | Other Metals | HCl | Total Chloride |
|---|---|---|---|---|---|
| ~120.- | ~2.- | ~2.- | ~2.- | ~165.- | ~310 |

Thus it can be seen that the leach solution is characteristically a high-acid nickel chloride solution with relatively small but significant impurity concentrations of cobalt and copper and other metals. As described in the above patent the cobalt and copper can be removed from the acid nickel chloride solution as anionic chloride complexes by co-extraction into a substantially water-immiscible organic solvent containing an amine solvent such as TIOA.

When this loaded organic solution is subsequently contacted with a stripping solution such as water or dilute chloride solutions, cobalt can be preferentially back-extracted or stripped from the organic into the aqueous phase to such a surprising extent that substantially all the cobalt can be stripped with only a minor portion of the copper. Thus characteristically as much as 75 percent or so of the copper remains in the organic from which it can be subsequently stripped into a separate aqueous stripping solution thereby regenerating the organic for recycle to the original co-extraction of cobalt and copper, and advantageously providing separate cobalt and copper eluates which can be treated independently for recovery of their respective metals.

It is to the treatment of the cobalt eluate that this invention is particularly directed. Thus it has been discovered that substantially all the copper in the cobalt eluate can be extracted therefrom with only a minor portion of the cobalt, characteristically less than about 10 percent, thereby providing a substantially copper-free cobalt eluate from which cobalt can be subsequently recovered. Such amazing separations of copper and cobalt from one another by solvent extraction cannot be anticipated or explained by existing published information.

SUMMARY OF THE INVENTION

The invention is improved means for recovery of cobalt and copper from aqueous chloride solutions by a solvent extraction process in which a substantially water-immiscible organic solution containing an amine solvent such as TIOA is cycled around a circuit comprising in turn, co-extraction of cobalt and copper from the chloride solution, preferential stripping of cobalt from the loaded organic by water or a dilute chloride solution thereby forming a cobalt eluate, subsequent stripping of copper from the organic by another stream of water or dilute chloride solution, and return of the regenerated organic to co-extraction of cobalt and copper.

The invention comprises dividing the organic solution prior to co-extraction into two streams, co-extracting cobalt and copper into one of the streams, preferentially extracting copper from the cobalt eluate into the other stream, combining the two organic streams to form a combined loaded organic solution, and preferentially stripping cobalt from the combined organic solution thereby forming the cobalt eluate and closing a preferential cobalt-stripping, preferential copper-extracting circuit for improved separation of copper from cobalt.

Thus the principal object of the present invention is to provide improved solvent extraction means for recovery of copper and cobalt from aqueous chloride solutions. A more particular object is to provide improved means for separating copper from cobalt in aqueous chloride solutions.

The invention can be more clearly understood by reference to the following drawings.

BRIEF DESCRIPTION OF THE DRAWINGS

FIG. 4 shows extraction curves for cobalt and copper both alone and together in solution.

DESCRIPTION OF THE PREFERRED EMBODIMENTS

Figure 1:
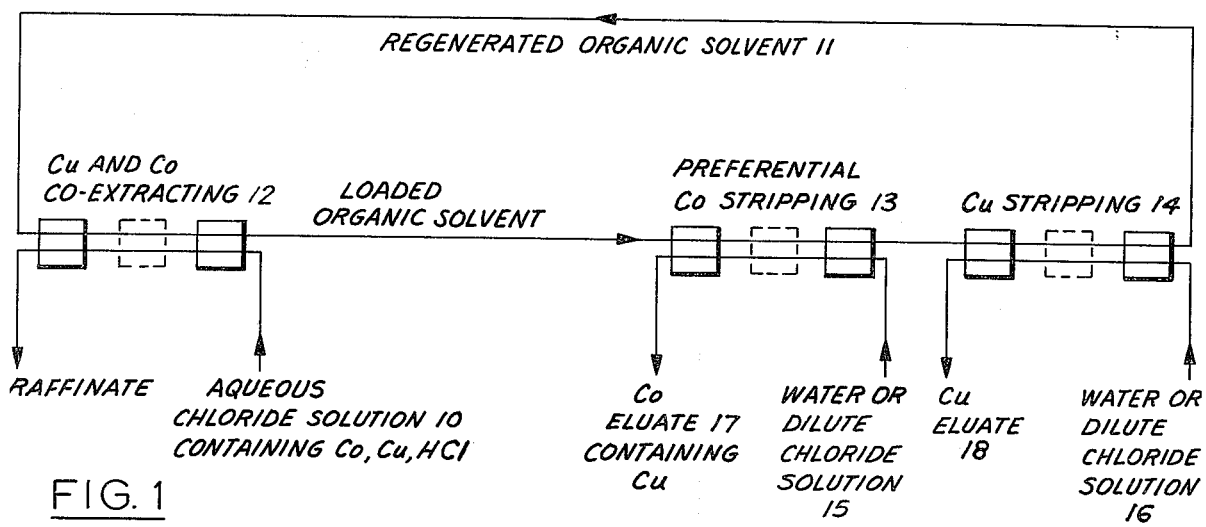
FIG. 1 is a schematic flow diagram of a basic solvent extraction circuit of which the present invention is an improvement.

FIG. 1 represents a basic solvent extraction flowsheet of the prior art for co-extraction of cobalt and copper from chloride solution 10 and their individual recovery in separate stripping circuits. The organic solvent 11 circulates in a closed loop through a co-extraction stage 12, followed by preferential stripping of Co 13, followed in turn by Cu stripping 14, and return of the regenerated organic to the co-extraction stage. The extraction and stripping circuits are all shown, advantageously although not necessarily, as providing multistage countercurrent contact between aqueous and organic phases. The stripping solutions 15, 16 can be water or dilute chloride solution. In the broadest sense dilute chloride solution means a solution whose total chloride concentration is such that the resulting cobalt eluate 17 and copper eluate 18 have a lower total chloride concentration than that of the solution from which cobalt and copper are initially co-extracted.

To illustrate the application of the treatment scheme of FIG. 1 to recovery of cobalt and copper from chloride solution, reference is made to Table I below in which the analyses of the various solutions are quoted in g/L.

dicated in line 6, and the regenerated organic indicated in line 7 which was recycled to the co-extraction stage. Calculation shows that preferential Co stripping resulted surprisingly and advantageously in substantially complete recovery of Co in the Co eluate with only about 25 percent of the Cu, a degree of separation that could not possibly be anticipated in light of the existing art. Even so further separation of Cu from Co in the Co eluate is desirable and such is the object of the present invention.

Figure 2:
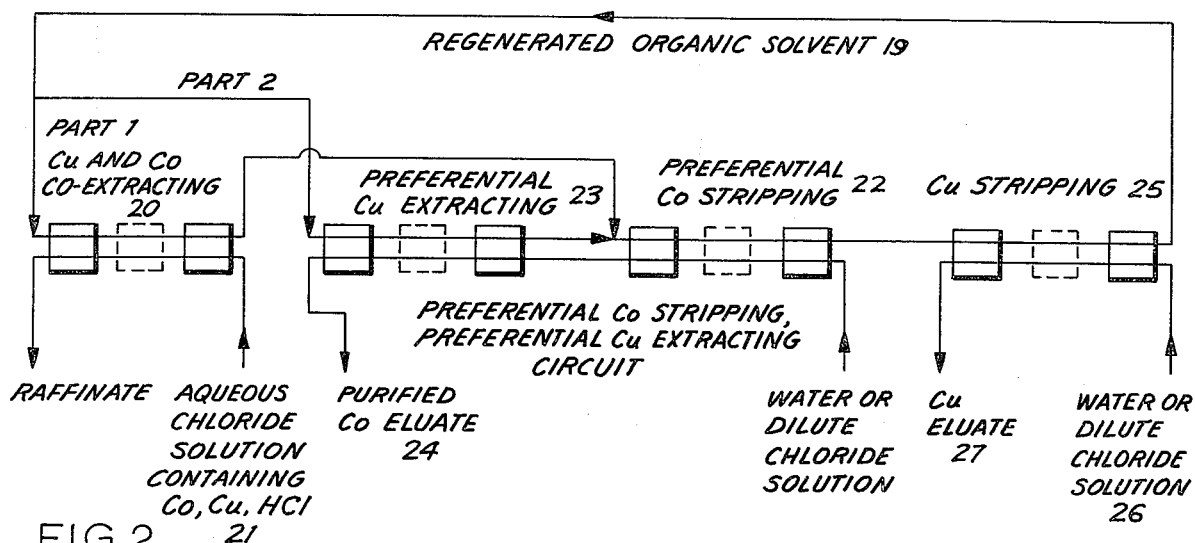
FIG. 2 is a modification of FIG. 1 incorporating a practice embodying the present invention.

Thus FIG. 2 illustrates a modification of the solvent extraction flowsheet of FIG. 1 for improved separation of copper from cobalt by solvent extraction according to the teachings of the present invention. The regenerated organic solvent 19 is divided into two parts, 1 and 2. Part 1 is used to co-extract Co and Cu in operation 20 from the initial aqueous chloride solution 21 and the resulting loaded organic then passes to preferential Co Table I

|   | | Flow L/min | Co | Cu | HCl | Total Chloride | Co/Cu |
|---|---|---|---|---|---|---|---|
| 1. | Aqueous Chloride Solution | 7.4 | 1.88 | 1.24 | ~160 | ~300 | 1.52 |
| 2. | Raffinate | (7.4) | 0.0006 | <0.01 | ~160 | ~300 | |
| 3. | Loaded Organic | 5.1 | 2.80 | 1.58 | | | 1.77 |
| 4. | Co Eluate | 0.24 | 60 | | 8.6 | 24.8 | ~104    7.0 |
| 5. | Organic after Co Stripping | (5.1) | 0.007 | 1.03 | | | |
| 6. | Cu Eluate | 0.3 | 0.3 | 17.9 | 2.3 | ~23 | |
| 7. | Regenerated Organic | (5.1) | 0.003 | 0.006 | | | |

Solutions 1. and 2. contained ~120 g/L Ni

The original aqueous chloride solution, as shown in line 1, was an acid nickel chloride solution containing 1.88 g/L Co and 1.24 g/L Cu. It was contacted with an organic solution containing 10 percent TIOA in Solvesso 100 solvent and Co and Cu were co-extracted from the aqueous in the manner indicated in FIG. 1. The raffinate was substantially depleted of Co and Cu, as shown in line 2 of the table, while the loaded organic contained 2.80 g/L Co and 1.58 g/L Cu, as shown in line 3. The organic was then contacted with water and Co was preferentially stripped, as indicated in line 4 by the much increased Co/Cu ratio of the Co eluate over that of the loaded organic. The organic solution, substantially depleted of cobalt as shown in line 5, was again contacted by water to produce the Cu eluate, indicated in line 6, and the regenerated organic indicated in line 7 which was recycled to the co-extraction stage.

stripping 22 in a manner similar to that shown in FIG. 1. The Co eluate from preferential Co stripping is contacted with Part 2 of the organic, the effect of which, according to the invention, is to extract Cu preferentially from the Co eluate thereby producing a purified Co eluate 24 and another Cu-loaded organic solution. The two loaded organic solutions are combined for the preferential Co stripping 22 and the resulting organic is then stripped of its copper in operation 25, using water or dilute chloride solution 26 and forming copper eluate 27, before recycling and division again into Parts 1 and 2.

Practice of the invention according to the flowsheet of FIG. 2 is illustrated by reference to Table II below in which the analyses of solutions are quoted in g/L.

Table II

|   | | Flow L/min | Co | Cu | HCl | Total Chloride | Co/Cu |
|---|---|---|---|---|---|---|---|
| 1. | Aqueous Chloride Solution | 7.4 | 1.87 | 1.36 | ~160 | ~300 | 1.38 |
| 2. | Raffinate | (7.4) | 0.0001 | 0.017 | ~160 | ~300 | |
| 3. | Part 1 Loaded Organic | 7.5 | 1.60 | 1.28 | | | 1.25 |
| 4. | Part 2 Loaded Organic | 1.8 | 0.5 | 1.57 | | | |
| 5. | Unpurified Co Eluate | 0.4 | 44 | 8.2 | 28.2 | ~90 | 5.36 |
| 6. | Purified Co Eluate | (0.4) | 40.1 | 0.32 | 27.6 | ~75 | 125 |
| 7. | Cu Eluate | 0.55 | 0.58 | 16.9 | 2.6 | ~22 | |
| 8. | Regenerated Organic | 9.3 | 0.0003 | 0.006 | | | |

Solutions 1. and 2. contained ~120 g/L Ni

The initial aqueous chloride solution was again acid nickel chloride similar to that in the earlier example and contained 1.87 g/L Co and 1.36 g/L Cu, as shown in line 1. The Co and Cu were co-extracted into Part 1 of the organic thereby providing a raffinate substantially devoid of Co and Cu, as shown in line 2, and Part 1 loaded organic solution containing 1.60 g/L Co and 1.28 g/L Cu, as shown in line 3. Copper in the Co eluate was preferentially extracted into Part 2 of the organic to give Part 2 loaded organic solution containing 0.5 g/L Co and 1.57 g/L Cu, as shown in line 4. Part 1 and Part 2 loaded organic solutions were combined into one stream from which Co was preferentially stripped by water to provide the Co eluate from which Cu was preferentially extracted by the Part 2 organic, thereby establishing the closed, preferential Co-stripping, preferential CU-extracting circuit that characterizes this invention. The unpurified Co eluate contained 44.0 g/L Co and 8.2 g/L Cu, as shown in line 5, and after removal of Cu according to the teaching of this invention, the purified Co eluate contained 40.1 g/L Co and only 0.32 g/L Cu, as shown in line 6. Thus the Co/Cu ratio of the Co eluate was increased from 6.35 before purification to 125.0 afterwards by application of the present invention. After Co stripping, the combined organic solution was contacted again by water thereby producing a Cu eluate containing 0.58 g/L Co and 16.9 g/L Cu, as shown in line 7, and a regenerated organic substantially devoid of Co and Cu, as shown in line 8, for recycling, as shown in FIG. 2, and division again into Parts 1 and 2.

Calculation shows, as in the previous example, that preferential Co stripping resulted in substantially complete recovery of Co into the Co eluate with only about 25 percent of the Cu. Then, according to the practice of this invention, substantially all of the Cu in the Co eluate was preferentially extracted therefrom with only about 10 percent of the accompanying Co, providing a purified Co eluate substantially devoid of copper by solvent extraction means, a result which is completely unanticipated by the prior art.

Figure 3:
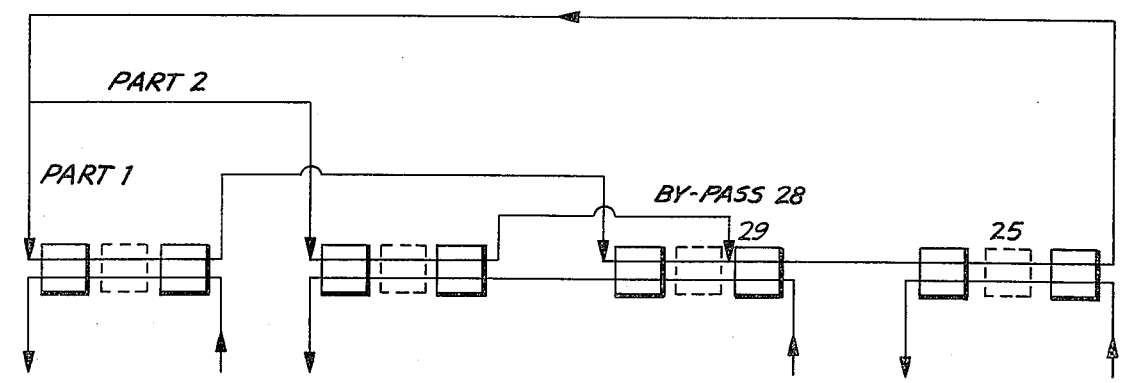
FIG. 3 is an alternative modification of FIG. 2.

FIG. 3 illustrates a refinement of the flowsheet of FIG. 2 by which an even greater separation of copper from cobalt is effected than by the means indicated in FIG. 2. No identifying wording is included in FIG. 3 since it is the same as FIG. 2 except for the "by-pass" 28, as shown. The refinement relates to a multi-stage countercurrent circuit for preferential stripping of Co from the loaded organic solution and contemplates combining the Part 1 and Part 2 loaded organic solutions at a point such that the Part 2 solution by-passes at least one of the Co stripping stages. In FIG. 3, for example, the Part 2 loaded solution is shown joining the Part 1 solution at location 29 for only one stage of Co stripping before passing out of the Co stripping circuit to the subsequent Cu stripping operation 25. The effect of this practice on removal of Cu from the Co eluate is emphatically demonstrated by reference to Table III below in which the analyses of solutions are quoted in g/L.

Table III

| | | Flow L/min | Co | Cu | HCl | Total Chloride | Co/Cu |
|---|---|---|---|---|---|---|---|
| 1. | Aqueous Chloride Solution | 7.4 | 1.53 | 0.88 | ~160 | ~300 | 1.75 |
| 2. | Raffinate | (7.4) | 0.0009 | 0.003 | ~160 | ~300 | |
| 3. | Part 1 Loaded Organic | 5.0 | 2.30 | 1.50 | | | 1.53 |
| 4. | Part 2 Loaded Organic | 2.8 | 1.30 | 0.48 | | | |
| 5. | Unpurified Co Eluate | 0.3 | 57.8 | 5.7 | 26.4 | ~102 | 10.- |
| 6. | Purified Co Eluate | (0.3) | 43.8 | 0.04 | 19.3 | ~72 | 1095.- |
| 7. | Cu Eluate | 0.6 | 2.28 | 13.9 | 3.2 | ~72 | |

Solutions 1. and 2. contained ~120 g/L Ni

Thus while the Co/Cu ratio of the original solution was less than 2, that of the purified Co eluate was more than 1000, an increase of more than 500 times by application of the simple but highly effective means of the present invention.

Why the separation of Cu from Co effected by the practice of this invention is so great is not fully understood but part of the explanation might be implied by the curves drawn in FIG. 4 which show both the concentrations of Co and Cu in the organic phase as a function of total chloride concentration when each metal is present alone in solution, and also the corresponding concentrations of the two metals when they co-exist in solution. The organic solution was 10 percent TIOA in Solvesso 100 and was acidified with 6.3N HCl before use. Aqueous chloride solutions were prepared containing 18.1 g/L Co and/or 19.5 g/L Cu, and varying concentrations of HCl to adjust chloride normality. One part of the acidified TIOA solution was mixed in a separatory funnel for 3 minutes with three parts of an aqueous solution and this procedure was repeated 3 times with the same organic and fresh aqueous. Following analysis of both phases, the maximum loading of the organic obtained in each case was calculated as mol/L in 100 percent TIOA and plotted against total chloride normality in the aqueous.

FIG. 4 clearly indicates that while the curves for each of Cu and Co alone in solution are similar in shape and merely displaced somewhat from one another along the abscissa, those for Cu and Co co-existing in solution are vastly different from one another and suggest that copper has a tremendously inhibiting effect on the co-extraction of cobalt over a considerable range of chloride normality, a phenomenon that as far as is known, has not previously been brought to light and could not be anticipated on the basis of the separate extraction curves for Co and Cu alone. However, this phenomenon is explained, and whether or to what extent it is responsible for the separation of copper from cobalt indicated above in the discussion of FIGS. 2 and 3, the fact remains that highly effective solvent extraction means are provided according to the teachings and practice of this invention by which copper can be substantially completely separated from cobalt, contrary to expectations based on the published art.

The conditions under which the invention is practised are open to considerable choice. Thus the organic solvent, for example, while advantageously TIOA, can be any amine solvent that will extract anionic chloride complexes of cobalt and copper, such as for example tri caprilyl amine and tri caprilyl-methyl-ammonium chloride. The organic diluent in which the solvent is dissolved can be any diluent which is miscible with the solvent to form organic solutions that are substantially immiscible in aqueous solutions and does not form a second organic phase after loading, such as Solvesso, xylene and its derivatives. The organic solvent and diluent can be blended in any convenient proportions and contacted with the aqueous solution at any convenient aqueous to organic ratio.

One necessary condition is that the chloride concentration of the cobalt eluate be less than that of the aqueous solution from which the cobalt and copper are initially co-extracted and since the stripping solution can be conveniently, and is advantageously, water, this condition is readily met. It might be desirable in some cases, however, to use dilute chloride solutions for stripping and this is perfectly all right providing the chloride concentration of the eluate is not so high that copper is stripped preferentially with respect to cobalt rather than the other way around. As can be seen from FIG. 4, the extraction curves for Co and Cu cross at relatively high chloride normalities, and to ensure that cobalt is stripped preferentially with respect to copper it is therefore necessary to ensure that the chloride concentration of the eluate is below that of the crossover. The crossover concentration varies as a function of a variety of parameters such as the relative and absolute concentrations of cobalt and copper and the cations that are associated with the chloride ions in solution, be they copper, cobalt, nickel, hydrogen or others. Experimentation under a variety of conditions has indicated that crossover occurs in the approximate range of about 6 to 8 normal chloride and this range therefore dictates the maximum chloride concentration of the cobalt eluate. In practice, however, it is unlikely that it would be higher than about 3 to 5 normal, and would more likely be about 2 to 3 normal. The chloride concentration of the aqueous solution from which the cobalt and copper are initially extracted, on the other hand, would in all likelihood be considerably higher than 4 or even 8 normal, as in the examples above, at which normalities cobalt is actually extracted preferentially with respect to copper.

The extraction and stripping circuits can be single or multi-stage although the latter is presumably preferred in most if not all cases. While the Parts 1 and 2 loaded organic solution are combined for preferential Co stripping therefrom, it is not necessary in a multi-stage stripping operation that the Part 2 organic pass through all the stages as long as it passes through at least one of the stages, as depicted, for example, in FIG. 3.

In essence the invention provides a preferential Cu extraction circuit within a preferential Co stripping circuit and thereby achieves in a highly effective and unexpected manner a double separation of cobalt and copper from one another such that copper is substantially eliminated from the resulting Co eluate.

What we claim is:

1. In a method for recovering cobalt and copper from an aqueous chloride solution having a minimum total chloride concentration of about 7N, and containing cobalt, copper and hydrochloric acid in which cobalt and copper are co-extracted by contacting said solution with a substantially water-immiscible organic solution containing a tertiary amine solvent which will extract anionic chloride complexes of cobalt and copper and cobalt is preferentially stripped from the so produced cobalt and copper-bearing organic solution by water or dilute chloride solution having a maximum total chloride concentration of 5N, thereby forming a cobalt eluate containing copper, the improvement for separating copper from cobalt comprising,
    i. dividing the water-immiscible organic solution into a first part and a second part,
    ii. co-extracting cobalt and copper into the first part thereby forming a first cobalt and copper-bearing organic solution,
    iii. preferentially extracting copper from the cobalt eluate containing copper into the second part, thereby forming a purified cobalt eluate and a second cobalt and copper-bearing organic solution, said cobalt eluate containing copper having a maximum chloride concentration of 5N,
    iv. combining the first and second cobalt and copper-bearing organic solutions thereby forming a combined loaded organic solution,
    v. preferentially stripping cobalt from the combined organic solution with an aqueous solution having a maximum chloride concentration of 4N, thereby forming the cobalt eluate containing copper and a cobalt-depleted organic solution,
    vi. stripping copper from the cobalt-depleted organic solution thereby forming a copper eluate and a stripped organic solution, and,
    vii. recycling the stripped organic solution.

2. Method according to claim 1 comprising preferentially extracting copper in a multi-stage counter-current extracting circuit.

3. Method according to claim 1 in which the amine solvent is tri-iso-octyl-amine.

4. Method according to claim 1 comprising preferentially stripping cobalt in a multi-stage counter-current stripping circuit containing a first and last organic treatment stage.

5. Method according to claim 4 comprising passing the first cobalt and copper-bearing organic solution through the first organic treatment stage and forming the combined organic solution following the first organic treatment stage and prior to the last organic treatment stage.

6. Method according to claim 4 comprising preferentially extracting copper in a multi-stage counter-current extracting circuit.

7. Method according to claim 5 comprising preferentially extracting copper in a multi-stage counter-current extracting circuit.

8. Method according to claim 7 in which the amine solvent is tri-iso-octyl-amine.

* * * * *